(12) United States Patent
 Ur

(10) Patent No.: US 9,306,973 B2
(45) Date of Patent: Apr. 5, 2016

(54) DEFENDING AGAINST BROWSER ATTACKS

(75) Inventor: Shmuel Ur, Galil (IL)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 13/809,482

(22) PCT Filed: Aug. 6, 2012

(86) PCT No.: PCT/US2012/049697
§ 371 (c)(1),
(2), (4) Date: Jan. 10, 2013

(87) PCT Pub. No.: WO2014/025334
PCT Pub. Date: Feb. 13, 2014

(65) Prior Publication Data
US 2014/0041025 A1   Feb. 6, 2014

(51) Int. Cl.
*G06F 11/00* (2006.01)
*H04L 29/06* (2006.01)

(52) U.S. Cl.
CPC .......... *H04L 63/1466* (2013.01); *H04L 63/168* (2013.01)

(58) Field of Classification Search
None
See application file for complete search history.

(56) References Cited

U.S. PATENT DOCUMENTS

| | | | |
|---|---|---|---|
| 7,051,285 B1* | 5/2006 | Harrison et al. | 715/760 |
| 7,343,626 B1* | 3/2008 | Gallagher | 726/25 |
| 8,225,401 B2 | 7/2012 | Sobel et al. | |
| 2006/0013228 A1* | 1/2006 | Malloy et al. | 370/394 |
| 2007/0016949 A1* | 1/2007 | Dunagan et al. | 726/22 |
| 2008/0115214 A1* | 5/2008 | Rowley | 726/22 |
| 2008/0172741 A1* | 7/2008 | Reumann et al. | 726/23 |
| 2011/0093773 A1* | 4/2011 | Yee | 715/235 |
| 2011/0185421 A1 | 7/2011 | Wittenstein et al. | |
| 2012/0304295 A1 | 11/2012 | Reumann et al. | |
| 2013/0305322 A1* | 11/2013 | Raleigh et al. | 726/4 |
| 2014/0115701 A1* | 4/2014 | Moshchuk et al. | 726/23 |

FOREIGN PATENT DOCUMENTS

KR   1020090108000 A   10/2009

OTHER PUBLICATIONS

International Search Report from International Application No. PCT/US12/49697 mailed Oct. 12, 2012.
"FireID Debuts Out-of-Band Transaction Verification Application", EON: Enhanced Online News, May 3, 2010.
"Entrust Stops Man-in-the-Browser Malware," accessed at http://web.archive.org/web/20130104122031/http://www.entrust.com/mitb/index.htm, accessed on Sep. 16, 2014, pp. 1-2.
"Man-in-the-browser," accessed at http://web.archive.org/web/20121116151943/https://en.wikipedia.org/wiki/Man-in-the-browser, last modified on Sep. 13, 2012, pp. 1-8.

(Continued)

*Primary Examiner* — Nirav B Patel
*Assistant Examiner* — Mohammed Waliullah
(74) *Attorney, Agent, or Firm* — Brundidge & Stanger, P.C.

(57) ABSTRACT

In one example the opening of a primary browser to a URL may be detected, a reference browser may then be opened to the same URL, data input to respective data fields on the primary browser may be copied to respectively corresponding data fields on the reference browser, and security on the primary browser may be evaluated based on, at least, the data copied to the reference browser.

13 Claims, 4 Drawing Sheets

(56) References Cited

OTHER PUBLICATIONS

Kelly, S., "Hackers outwit online banking identity security systems," accessed at http://web.archive.org/web/20121104163906/http:// www.bbc.co.uk/news/technology-16812064, published on Feb. 10, 2012, pp. 1-2.

Gühring, P., "Concepts against Man-in-the-Browser Attacks," pp. 1-15, (Jan. 24, 2007).

* cited by examiner

DEFENDING AGAINST BROWSER ATTACKS

CROSS-REFERENCE TO RELATED APPLICATION

This Application is the National Stage filing under 35 U.S.C. §371 of PCT Application Ser. No. PCT/US12/49697 filed on Aug. 6, 2012. The disclosure of the PCT Application is hereby incorporated herein by reference in its entirety.

TECHNICAL FIELD

The embodiments described herein pertain generally to implementing one or more safeguards against unauthorized transactions that may be executed due to browser attacks.

BACKGROUND

As the proportion of commerce that is conducted online increases, so do attempts to exploit the technology that enables and facilitates such transactions for illegal gain. In particular, browser attacks may be utilized to exploit a user's legitimate access to a website for a financial institution or place of commerce by conducting stealth transactions.

SUMMARY

In one example embodiment, a computer-readable medium stores one or more computer-executable instructions that cause one or more processors to detect that a primary browser has opened to a URL, open a reference browser to the URL, copy data input to respective data fields on the primary browser to respectively corresponding data fields on the reference browser, and evaluate security on the primary browser based on, at least, the data copied to the reference browser.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
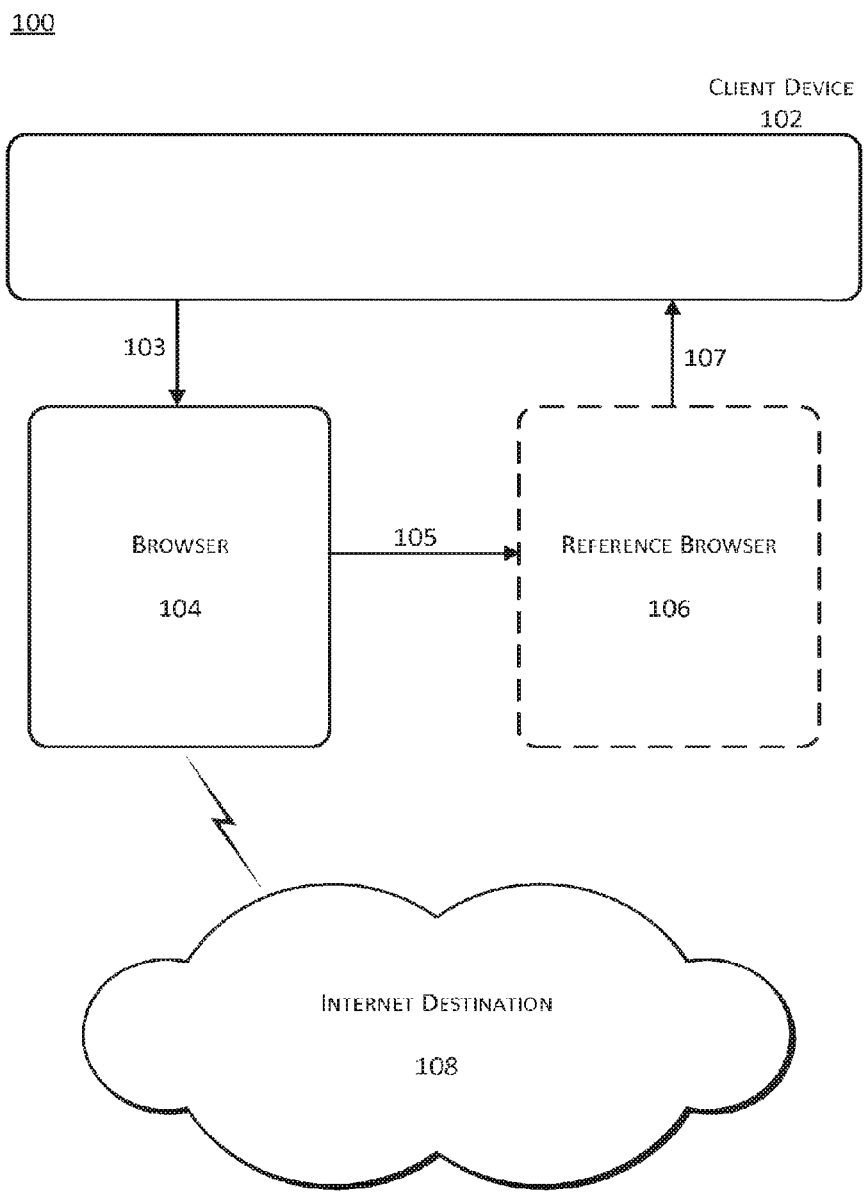
FIG. 1 shows an example system configuration in which browser attacks may be defended against, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 100 in which browser attacks may be defended against, arranged in accordance with at least some embodiments described herein. As depicted, configuration 100 includes, at least, a client device 102 with an instance of a browser 104 and a reference browser 106 hosted thereon, and an internet destination 108. Non-limiting examples of internet destination 108 may include a website for a financial institution or a website for a place of commerce.

Client device 102 may refer to a processor-based electronic device on which an instance of browser 104 and reference browser 106 may be hosted to implement at least some aspects of defending against browser attacks. Further, client device 102 may be configured to transmit and receive data over a communication link to internet destination 108 by further connecting to a mobile communications network provided by a wireless service provider (not shown). Client device 102 may be implemented as a mobile (or portable) electronic device such as a mobile phone, cell phone, smartphone, personal data assistant (PDA), a personal media player device, an application specific device, or a hybrid device that includes any of the above functions. Client device 102 may also be implemented as a personal computer including tablet, laptop computer, and non-laptop computer configurations, which may be connected to the aforementioned mobile communications network or, alternatively, to a wired network.

The aforementioned wireless service provider for implementing communications for client device 102 may also be known as a mobile network carrier, wireless carrier, or even cellular company. Regardless of the alternate reference, the wireless service provider may provide services for mobile communications subscribers.

Client device 102 may further include an operating system (OS) configuration of various components or modules, e.g., implemented by a framework of hardware, software, firmware, or any combination thereof. Such software and/or firmware may include one or more computer-readable media including but not limited to Application Specific Integrated Circuit (ASIC) or Customer Specific Integrated Circuit (CSIC). The various components or modules corresponding to the aforementioned OS configuration may include, but are not limited to, browser 104 and reference browser 106.

Browser 104 may refer to a component or module running on the OS that is configured to facilitate user interaction with at least internet destination 108. By way of example, upon opening up on a display of client device 102, browser 104 may refer to a software application for retrieving, presenting, and otherwise traversing information on the Internet by presenting the user of client device 102 with a web-based user interface, command line interface, or touch user interface. Of course, the embodiments of defending against browser attacks are not limited to such interfaces, and should be interpreted as encompassing any and all embodiments of direct manipulation interfaces.

Typical of web browsers, browser 104 may facilitate electronic commerce, whereby a user of client device 102 may purchase goods or services over the Internet using credit cards, debit cards, debiting existing accounts, etc. In addition to such "business-to-consumer" online shopping, electronic commerce facilitated by browser 104 may further include financial management with banks or other financial institutions, transaction processing, account management, inventory management, etc. The examples of commerce, electronic data exchanges, etc., that may be facilitated by browser 104 and to which the embodiments of defending against browser attacks may be applicable are unbounded.

Data input 103 represents the inputting of data, as described herein, into appropriate data fields on browser 104 via the user interface on browser 104. Such data input may be implemented by user interaction with the user interface provided by browser 104, with data being input by means of a keyboard, a mouse, a stylus, multi-touch input, or even voice-commands. Further still, examples of such data input may include programmatic input, i.e., by program and/or process.

Browser 104 may facilitate electronic commerce, in part, by transmitting to Internet destination 108 authentication data that is input to appropriate data fields on browser 104 by user interaction with the user interface on browser 104. The authentication data may then be sent to Internet destination 108 by clicking or otherwise activating a "send" or other button on the user interface. When the transmitted authentication information is verified at or by internet destination 108, the intended transaction may be further executed utilizing input from client device 102, via the user interface on browser 104. In some embodiments, such input may be automated.

Reference browser 106 may refer to a component or module running on the aforementioned OS that is configured to run as a "stealth" browser on client device 102. Alternatively, reference browser 106 may run on a remote server to which client device is communicatively connected. Regardless, in stealth mode, reference browser is not intended to be viewed on the display of client device 102, although alternative embodiments of defending against browser attacks may contemplate means and methods for reference browser 106 to be displayed on, at least, a display of client device 102.

Further, reference browser 106 may or may not be communicatively coupled to the internet, although browser 104 is coupled in order to conduct electronic commerce. Further still, while reference browser 106 is intended to mimic browser 104, some embodiments of reference browser 106 may remain static, i.e., do not accept add-ons from any internet source. Thus, reference browser 106 may not duplicate browser 104 in design or even protocol, but for the structure, i.e., data fields, and data input thereto.

Reference browser 106 may open or activate when browser 104 is detected as opening or activating to a URL (uniform resource locator), or any other identifier of an internet resource, corresponding to internet destination 108. Reference browser 106 may be configured, designed, and/or programmed to mimic browser 104 by at least duplicating data fields displayed on browser 104 and copying data input thereto to the appropriately corresponding data fields. That is, data entered onto data fields on browser 104 is copied onto corresponding data fields on reference browser 106.

Data transmission 105 represents the copying of data from data fields on browser 104 onto corresponding data fields on reference browser 106, in accordance with at least some embodiments described herein.

When data input to the data fields on browser 104 is transmitted to internet destination 108, at the URL or other identifier identified by browser 104, reference browser 106 records the data input to the data fields of browser 104. The recorded data may be stored in a static or dynamic memory of client device 102.

Data transmission 107 represents the storing of the data recorded by reference browser 106 onto the static or dynamic memory of client device 102.

Reference browser 106 may then evaluate the security of browser 104 by comparing the recorded data to the data that is actually transmitted by browser 104 to internet destination 108. More particularly, reference browser 106 may be configured, designed, and/or programmed to further access a web cache or other repository of temporary internet files on client device 102 and compare the recorded data that was entered into the data fields on browser 104 to the data that was actually transmitted to internet destination 108.

If the comparison of the recorded data to the data that was actually transmitted to internet destination 108 reveals a discrepancy, an alarm component (not shown) on the OS of client device 102 may activate a visual or audible warning to inform the user of client device 102 that a browser attack has occurred and that the security of browser 104 has been compromised.

Alternatively, if the comparison of the recorded data to the data that was actually transmitted to internet destination 108 reveals no discrepancy, the operation of reference browser 106 remains in the background, unannounced to the user of client device 102.

As indicated above, reference browser 106 may or may not be communicatively coupled to the internet. However, reference browser 106 is communicatively coupled to browser 104 and may even be further communicatively coupled to other client applications on client device 102, particularly those by which internet-based communication is facilitated between client device 102 and internet destination 108. Non-limiting examples of such client applications may include proprietary applications designed by or for an entity represented by internet destination 108, e.g., e-mail applications, e.g., Outlook, etc.; applications for a bank or other financial institution; applications for a store or other place of commerce; applications for a service provider; applications for a consumer rewards program, etc. Thus, data transmission 105 may further represent the data received by client device 102 from internet destination 108 or a corresponding domain being communicated to reference browser 106, with the data being received by browser 104 or another client application on client device 102.

Thus, when a confirmation communication is transmitted from internet destination 108 or from a corresponding domain on the internet, reference browser 106 or another component on the OS of client device 102 may detect the incoming confirmation communication. In at least some embodiments of defending against browser attacks, a URL or other identifier to which data is transmitted may be cached for at least such purposes, i.e., detecting an incoming confirmation communication. Subsequently, reference browser 106 or the aforementioned another component on the OS of client device 102 may compare the recorded data, i.e., the data entered into the data fields of browser 104, to the data corresponding to those data fields as indicated in the detected confirmation communication when displayed on browser 104.

If the comparison of the recorded data to the data that is indicated in the confirmation communication, when displayed on browser 104, reveals a discrepancy, an alarm component on the OS of client device 102 may activate a visual or audio warning to inform the user of client device 102 that a browser attack has occurred and that the security of browser 104 had been compromised.

Alternatively, if the comparison of the recorded data to the data that is indicated in the confirmation communication reveals no discrepancy, the operation of reference browser 106 remains in the background, unannounced to the user of client device 102.

Internet destination 108 may refer to a website to which at least browser 104 is directed for retrieving, presenting, and otherwise traversing information on the internet to conduct electronic commerce, in accordance with embodiments described herein. Internet destination 108 may be identified on browser 104 by a URL, or some other identifier, on an address field thereof. The URL and a domain to which the virtual address space of the URL correspond may be saved in a static or dynamic memory on client device 102.

In some embodiments, internet destination 108 may be regarded as a cloud-based service and storage platform owned and/or operated by a third-party service provider. Internet destination 108 may include a framework of hardware, software, firmware, or any combination thereof, through which or to which digital data and information may be stored, passed, or shared with regard to a transaction for which at least one subscriber to the hosted service, including client device 102, is a party. Internet destination 108 may also be implemented as a web-based storage and sharing service to which client device 102 register prior to use.

Thus, FIG. 1 shows an example implementation of transaction verification in accordance with various embodiments of defending against browser attacks.

One type of attack that may produce a discrepancy between the recorded data and at least one of the data transmitted by browser 104 to internet destination 108 and the data that is indicated in the confirmation communication may be referred to a "man-in-the-browser" (MitB) attack. While MitB is just one of myriad attacks that may be defended against by the embodiments described herein, a description thereof provides a glimpse of context with regard to the unwitting transactions that may be executed even after proper authentication has been procured. MitB attacks may provide illicit access to the internet-based communication capabilities of browser 104 by exploiting common facilities provided to enhance browser capabilities, e.g., browser extensions and add-ons. Thus, defense against such attacks need be more concerned with transaction verification as opposed to credential validation.

Figure 2:
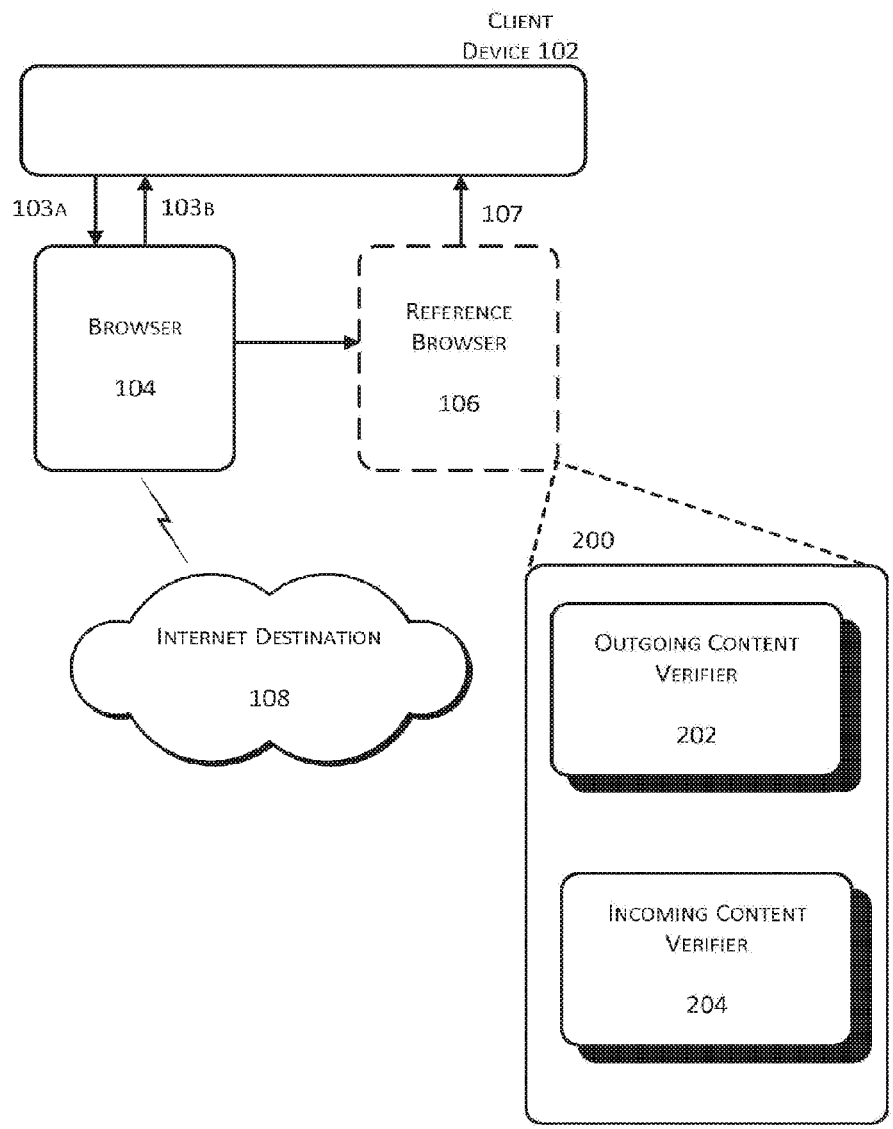
FIG. 2 shows an example configuration of a reference browser relative to the example system of FIG. 1, arranged in accordance with at least some embodiments described herein.

FIG. 2 shows an example configuration 200 of a reference browser relative to the example system of FIG. 1, arranged in accordance with at least some embodiments described herein. As depicted, example configuration 200 of reference browser 106, hosted on client device 102, includes an outgoing content verifier 202, and an incoming content verifier 204. However, this configuration is an example only, and is not intended to be limiting in any manner.

Outgoing content verifier 202 may refer to a component or module on the OS of client device 102 that is configured, designed, and/or programmed to verify that data sent from browser 104 to internet destination 108 is the same as the data entered into data fields on browser 104 by a user of client device 102.

By way of example, reference browser 106 records, in a static or dynamic memory of client device 102, data that is input to the data fields on browser 104. When the data input to the data fields on browser 104 is transmitted to internet destination 108, outgoing content verifier 202 may compare the recorded data to the data that is actually transmitted by browser 104 to internet destination 108. Outgoing content verifier 202 may be configured, designed, and/or programmed to access a web cache or other repository of temporary internet files on client device 102 and implement logic to compare the recorded data that was entered into the data fields on browser 104 to the data that was actually transmitted to internet destination 108.

If outgoing content verifier 202 reveals a discrepancy between the recorded data and the data that was actually transmitted to internet destination 108, an alarm component on the OS of client device 102 may activate a warning to inform the user of client device 102 that a browser attack has occurred and that the security of browser 104 has been compromised.

Alternatively, if outgoing content verifier 202 reveals no discrepancy between the recorded data and the data that was actually transmitted to internet destination 108, the operation of reference browser 106 remains in the background, unannounced to the user of client device 102.

Incoming content verifier 204 may refer to a component or module on the OS of client device 102 that is configured, designed, and/or programmed to verify that data received at browser 104 or some other client application on client device 102 is the same as the data entered into data fields on browser 104 by a user of client device 102.

By way of example, when a confirmation communication is transmitted from internet destination 108 or from a corresponding domain on the internet, incoming content verifier 204 or another component on the OS of client device 102 may detect the incoming confirmation communication. Then, incoming content verifier 204 may implement logic to compare the recorded data, i.e., the data entered into the data fields of browser 104, to the data corresponding to those data fields as indicated in the detected confirmation communication when displayed on browser 104.

Once again, if incoming content verifier 204 reveals a discrepancy between the recorded data and the data that is indicated in the confirmation communication, when displayed on browser 104 an alarm component on the OS of client device 102 may activate a warning to inform the user of client device 102 that a browser attack has occurred and that the security of browser 104 had been compromised.

Alternatively, if incoming content verifier 204 reveals no discrepancy between the recorded data and the data that is indicated in the confirmation communication, the operation of reference browser 106 remains in the background, unannounced to the user of client device 102.

Thus, FIG. 2 show an example configuration of transaction verification in accordance with various embodiments of a reference browser.

Figure 3:
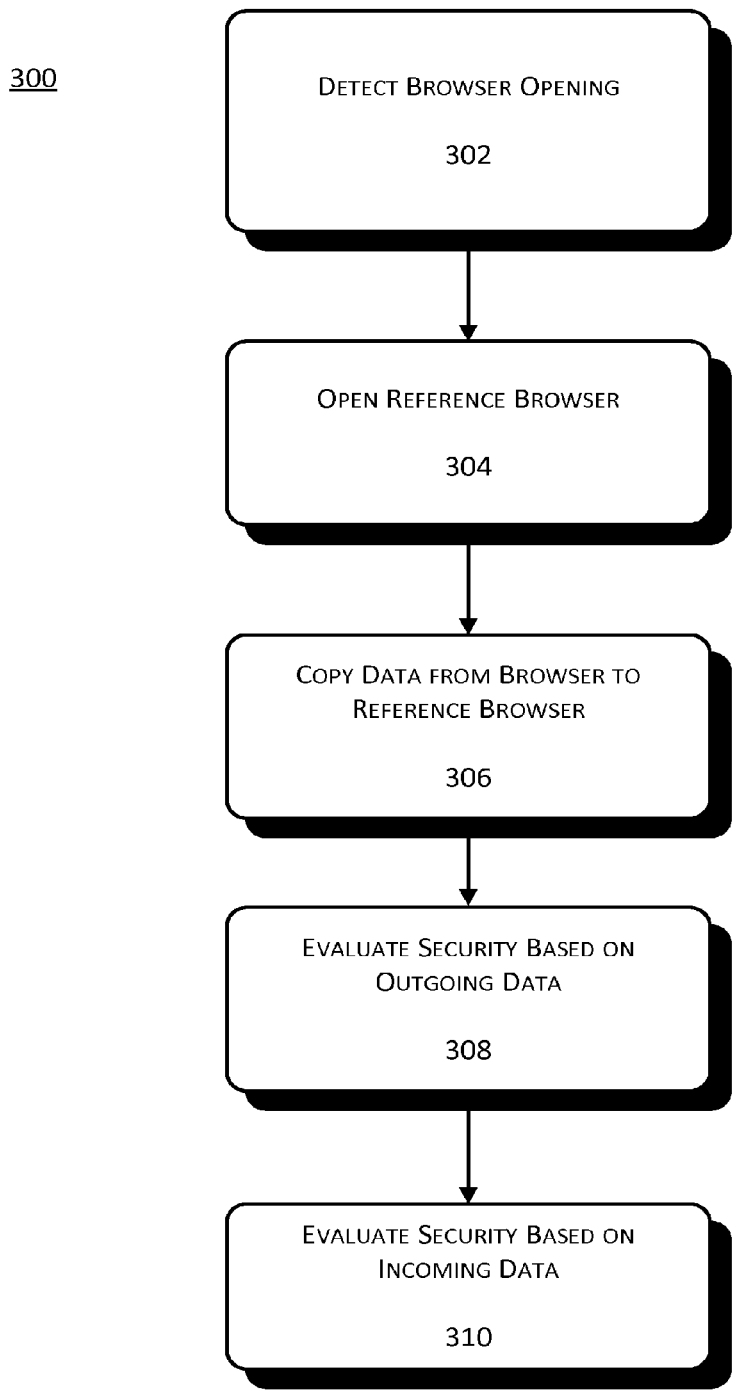
FIG. 3 shows an example configuration of a processing flow of operations for defending against browser attacks, in accordance with at least some embodiments described herein.

FIG. 3 shows an example configuration of a processing flow 300 of operations for defending against browser attacks, in accordance with at least some embodiments described herein. As depicted, processing flow 300 includes sub-processes executed by various components that are part of the OS on client device 102, including but not limited to browser 104 and/or reference browser 106. However, processing flow 300 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 302, 304, 306, 308, and/or 310. Processing may begin at block 302.

Block 302 (Detect Browser Opening) may refer to a component or module on the OS of client device 102 detecting that browser 104 has opened or activated to a URL or other identifier corresponding to internet destination 108. Processing may proceed from block 302 to block 304.

Block 304 (Open Reference Browser) may refer to a component or module on the OS of client device 102, which may or may not include reference browser 106, opening or activating reference browser 106. Reference browser 106, if communicatively connected to the internet, may open or activate to the same URL as browser 104, and then mimic at least the data fields displayed thereat. Alternatively, reference browser 106 may open at any time that the OS of client device 102 is running, and then mimic the data fields displayed on browser 104 as previously described. Further still, if reference browser 106 is not communicatively coupled to the internet, reference browser may mimic at least the data fields displayed on browser 104, as retrieved by data transmission 105. Processing may proceed from block 304 to block 306.

Block 306 (Copy Data from Browser to Reference Browser) may refer to reference browser 106 or some other component running on the OS of client device 102 implementing logic to copy data entered onto data fields on browser 104 onto corresponding data fields on reference browser 106. Processing may proceed from block 306 to block 308.

Block 308 (Evaluate Security Based on Outgoing Data) may refer to outgoing content verifier 202 or another module on the OS of client device 102 verifying that data sent from browser 104 to internet destination 108 is the same as the data entered into data fields on browser 104 by a user of client device 102.

Reference browser 106, by outgoing content verifier 202 or the aforementioned other module on the OS of client device 102, may record, in a static or dynamic memory of client device 102, data that is input to the data fields on browser 104. Outgoing content verifier 202 may compare the recorded data to the data that is actually transmitted by browser 104 to internet destination 108 by accessing a web cache or other repository of temporary internet files on client device 102 and implementing logic to compare the recorded data that was entered into the data fields on browser 104 to the data that was actually transmitted to internet destination 108. If outgoing content verifier 202 reveals a discrepancy between the recorded data and the data that was actually transmitted to internet destination 108, an alarm component on the OS of client device 102 may activate a visual or audio warning to inform the user of client device 102 that a browser attack has occurred and that the security of browser 104 has been compromised. Alternatively, if outgoing content verifier 202 reveals no discrepancy between the recorded data and the data that was actually transmitted to internet destination 108, the operation of reference browser 106 remains in the background. Processing may proceed from block 308 to block 310.

Block 310 (Evaluate Security Based on Incoming Data) may refer to incoming content verifier 204 or other module on the OS of client device 102 verifying that data received at browser 104 or some other client application on client device 102 is the same as the data entered into data fields on browser 104 by a user of client device 102.

When a confirmation communication is transmitted from internet destination 108 or from a corresponding domain on the internet, reference browser 106, by incoming content verifier 204 or another component on the OS of client device 102, may detect the incoming confirmation communication. Incoming content verifier 204 may implement logic to compare the recorded data to the data corresponding to those data fields as indicated in the detected confirmation communication when displayed on browser 104. If incoming content verifier 204 reveals a discrepancy between the recorded data and the data that is indicated in the confirmation communication when displayed, an alarm component on the OS of client device 102 may activate a visual or audio warning to inform the user of client device 102 that a browser attack has occurred and that the security of browser 104 had been compromised. Alternatively, if incoming content verifier 204 reveals no discrepancy between the recorded data and the data that is indicated in the confirmation communication, the operation of reference browser 106 remains in the background.

Thus, FIG. 3 shows an example processing flow for evaluating security on a browser by verifying a transaction implemented thereby.

Figure 4:
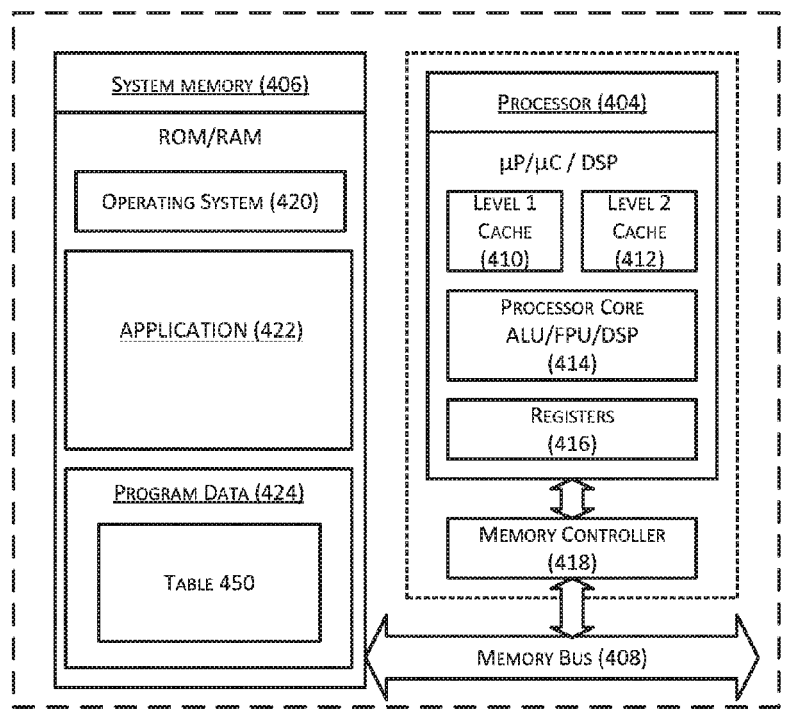
FIG. 4 shows a block diagram illustrating an example computing device by which various example solutions described herein may be implemented, arranged in accordance with at least some embodiments described herein.

FIG. 4 shows a block diagram illustrating an example computing device 400 by which various example solutions described herein may be implemented, arranged in accordance with at least some embodiments described herein.

More particularly, FIG. 4 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for defending against browser attacks.

In a very basic configuration, a computing device 400 may typically include one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 904.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may be configured to transmit or receive identification information pertaining to client device 102, verify or validate such identifying data, and transmit device data as described previously with respect to FIGS. 1-3. Further, application 422 may be configured to detect the opening of browser 104, and implement the logic for comparing stored data to data transmitted from or to browser 104 or some other client application on client device 102. Program data 424 may include a table 450, which may be useful for implementing actuation of appropriate components or modules as described herein.

System memory 406 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A non-transitory computer-readable medium storing one or more computer-executable instructions that, when executed, cause one or more processors to:
   detect that a primary browser has opened to a URL, the primary browser being executed on a client device;
   activate, by the client device, a reference browser to the same URL as the primary browser, the reference browser being executed but not viewable on the client device, the reference browser configured to mimic the primary browser that has opened to the URL by at least duplicating data fields displayed on the primary browser;
   copy data input to respective data fields displayed on the primary browser to the corresponding data fields on the reference browser;
   detect a transmission of data from the client device to a domain corresponding to the URL, the detected data transmission being a result of the data input on the primary browser;
   indicate an occurrence of an unauthorized activity on the client device based on, at least, a determination that the detected data transmission from the client device to the domain corresponding to the URL does not match the data input copied to the reference browser;
   detect an incoming confirmation transmission from the domain corresponding to the URL, the confirmation transmission corresponding to the transmission of the data from the client device to the domain corresponding to the URL; and
   indicate an occurrence of an unauthorized activity on the client device based on, at least, a determination that the detected incoming confirmation transmission does not match the data input copied to the reference browser.

2. The computer-readable medium of claim 1, wherein the indication is a notification.

3. The computer-readable medium of claim 1, wherein the reference browser does not accept add-ons.

4. The computer-readable medium of claim 1, wherein the data input copied to the reference browser is not transmitted to the domain corresponding to the URL.

5. The computer-readable medium of claim 2, wherein the notification includes a display of the data transmitted from the client device adjacent to the data input copied to the corresponding data fields on the reference browser.

6. The computer-readable medium of claim 1, wherein the indication is a notification that includes a display of the incoming confirmation transmission adjacent to the data input copied to the corresponding data fields on the reference browser.

7. The computer-readable medium of claim 1, wherein the data input to respective data fields on the primary browser is provided by a user.

8. A computer-implemented system, comprising:
   a memory;
   a storage; and
   at least one processor coupled to the memory and the storage, wherein at least one processor is configured to:
   open a first browser to a URL, the first browser being executed on a client device,
   receive data input to respective data fields on the first browser,
   activate, by the client device, a second browser to the same URL as the first browser, the second browser being executed but not viewable on the client device, the second browser configured to mimic at least a structure of the first browser,
   copy the data input to the respective data fields on the first browser into the corresponding data fields on the second browser,
   transmit data to a domain corresponding to the URL, the transmitted data being a result of the data input on the first browser,
   indicate an occurrence of an unauthorized activity on the client device based on, at least, a determination that the data transmitted to the domain corresponding to the URL does not match the data input copied to the second browser, receive, from the domain corresponding to the URL, a confirmation transmission that corresponds to the transmission of the data to the domain corresponding to the URL, and indicate an occurrence of an unauthorized activity on the client device based on, at least, a determination that the confirmation transmission received from the domain corresponding to the URL does not match the data input copied to the second browser.

9. The system of claim 8, wherein the indication is a display of a notification.

10. A method, comprising:

Activating, by a client device, a reference browser upon detecting that a first browser has opened to a URL, wherein the reference browser is activated to the same URL as the first browser, and wherein the first browser is executed on the client device, and the reference browser is executed but not viewable on the client device;

copying data input to data fields on the first browser into corresponding duplicate data fields on the reference browser that mimics at least a structure of the first browser;

transmitting data to an internet destination, the transmitted data resulting from the data input to the first browser;

determining that an attack has been made on the first browser in response to a determination that the data transmitted to the internet destination does not match the data input copied to the duplicate data fields on the reference browser;

detecting receipt of a confirmation message from the internet destination, the confirmation message including an alleged restatement of the data input to the first browser and transmitted to the internet destination; and determining whether an attack has been made on the first browser based on, at least, a comparison of the received confirmation message and the copied data input to the duplicate data fields on the reference browser.

11. The method of claim 10, wherein the determining includes determining whether a man-in-the-middle attack has been made on the first browser.

12. The method of claim 10, further comprising displaying a notification in response to determining that an attack has been made on the first browser.

13. The method of claim 10, further comprising providing a notification in response to a determination that an attack has been made on the first browser, the notification including a display of the data transmitted to the internet destination adjacent to the data input copied to the duplicate data fields on the reference browser.

* * * * *